United States Patent [19]

Oudet et al.

[11] 4,242,623

[45] Dec. 30, 1980

[54] MINIATURE ELECTRIC STEPPING MOTOR

[75] Inventors: Claude Oudet; Yves Guérin, both of Besancon, France

[73] Assignee: Portescap, La Chaux-de-Fonds, Switzerland

[21] Appl. No.: 38,293

[22] Filed: May 10, 1979

[30] Foreign Application Priority Data

May 12, 1978 [CH] Switzerland .................... 5175/78

[51] Int. Cl.³ ............................................. G05B 19/40
[52] U.S. Cl. .................................................. 318/696
[58] Field of Search ....................... 318/696, 685, 138

[56] References Cited

U.S. PATENT DOCUMENTS

| 3,541,418 | 11/1970 | Agin et al. | 318/696 |
| 3,573,593 | 4/1971 | Berry | 318/696 |
| 3,893,012 | 7/1975 | Lin | 318/696 |

*Primary Examiner*—B. Dobeck

*Attorney, Agent, or Firm*—Cushman, Darby & Cushman

[57] ABSTRACT

A miniature electric stepping motor comprising a magnetized rotor adapted for rotation in the air gap of a stationary magnetic circuit having an electric excitation coil connected to a control device. The control device cmprises means for applying to the excitation coil control impulses of a first polarity and of an amplitude and a width such that the rotor rotates in a first direction of rotation from one stable equilibrium position to the next one and means for applying to the excitation coil, upon an outer control, starting from each stable equilibrium position, first a pre-impulse of said first polarity and subsequently a control impulse in the reverse direction, having a polarity opposite to the said first polarity, such that the rotor, after having reversed its direction of rotation, moves in the reverse direction of rotation until it reaches the stable equilibrium position following that at which the said pre-impulse has been applied.

6 Claims, 6 Drawing Figures

MINIATURE ELECTRIC STEPPING MOTOR

FIELD OF INVENTION

This invention relates to a miniature electric stepping motor.

BACKGROUND OF INVENTION

Known miniature electric stepping motors comprise a magnetized rotor, a stationary magnetic circuit having spaced polar parts defining an air gap, an electric excitation coil, coupled to the stationary magnetic circuit, and a control device connected to the excitation coil, means for mounting the magnetized rotor for rotation in said air gap so that its poles cooperate with the polar parts of the stationary magnetic circuit, the magnetization of the rotor and the form of the polar parts being such that the rotor has at least one stable, equilibrium position, the control device comprising means for applying to the excitation coil, starting from each stable equilibrium position of the rotor, a control impulse having a first polarity, an amplitude and a width such that the rotor rotates in the said first direction of rotation until it reaches the next stable equilibrium position.

A motor of this kind is capable, by its nature, of operating in opposite directions of rotation depending on the polarity of the impulses applied to the excitation coil. However, owing to production tolerances and the variations of certain parameters, e.g. mechanical load, temperature, supply voltage, one generally renounces to use the possibility of operating the motor in opposite directions of rotation at will and chooses a stable equilibrium position so as to considerably favour one direction of rotation, i.e. so as to increase the work produced by the control impulse in this direction with respect to a position in which the two impulses would involve almost identical energies.

OBJECT OF THE INVENTION

An object of the invention is mainly to facilitate dimensioning and production as well as to increase safety of operation of a motor of the above-mentioned type, having two directions of rotation.

SUMMARY OF THE INVENTION

The invention provides a miniature electric stepping motor comprising a magnetized rotor, a stationary magnetic circuit having spaced polar parts defining an air gap, an electric excitation coil coupled to the stationary magnetic circuit, and a control device connected to the excitation coil, means for mounting the magnetized rotor for rotation in said air gap so that its poles cooperate with the polar parts of the stationary magnetic circuit, the magnetization of the rotor and the form of the polar parts being such that the rotor has at least one stable, equilibrium position located so as to precede, with respect to a first direction of rotation, the position in which the torque due to a constant current through the coil would attain its maximum, the control device comprising means for applying to the excitation coil, starting from each stable equilibrium position of the rotor, a control impulse having a first polarity, an amplitude and a width such that the rotor rotates in the said first direction of rotation until it reaches the next stable equilibrium position, and means for applying to the excitation coil, upon an external control, starting from each stable equilibrium position, first a pre-impulse of said first polarity and having an amplitude and a width such that the rotor rotates in the first direction of rotation but cannot reach the next stable equilibrium position in this direction of rotation, and subsequently, a control impulse in the reverse direction, having a polarity opposite to the said first polarity and an amplitude and a width such that the rotor, after having reversed its direction of rotation, moves in the reverse direction of rotation until it reaches the stable equilibrium position following that at which the said pre-impulse has been applied.

In this way, although one direction of rotation of the motor is favoured by conventional constructional measures, the rotor receives a rotation impulse in the reverse direction of rotation which is also sufficiently great, account being taken of all the tolerances and acceptable variations, to allow it to effect a step in the reverse direction of rotation. This is achieved in that the rotor, in order to rotate in the opposite direction of rotation with respect to the normal direction of rotation, effects first a short rotation in the normal direction and then rotates in the reverse direction, the control impulse in the reverse direction making it possible for the rotor to accumulate sufficient energy to attain the next stable equilibrium position in the reverse direction of rotation.

A better understanding of this invention will be obtained from the following detailed description and the accompanying drawings of an illustrative application of the invention.

DETAILED DESCRIPTION OF A PREFERRED EMBODIMENT

Figure 1:
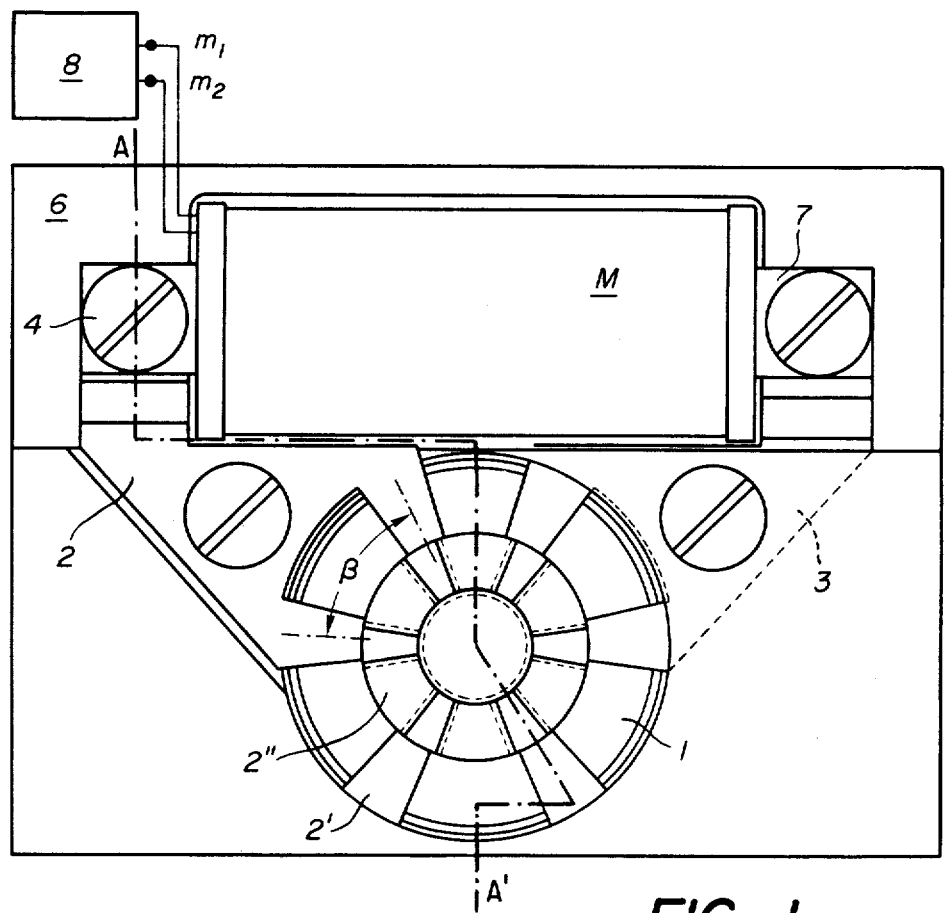
FIG. 1 is a plan view of a conventional motor to which the present invention is applied.
Figure 2:
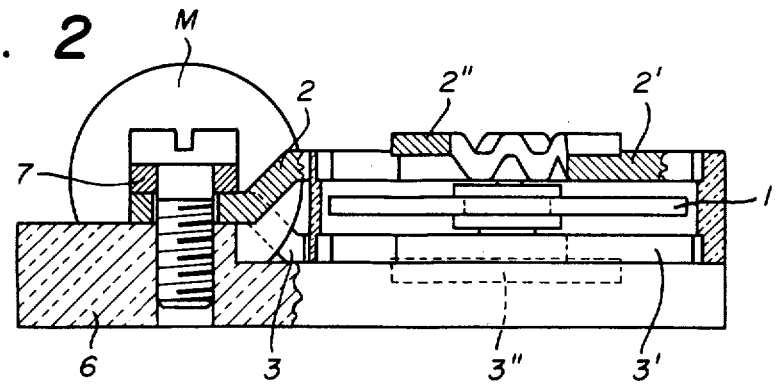
FIG. 2 is a cross-sectional view taken along lines A—A' of FIG. 1.

Referring to the drawings, FIGS. 1 and 2 show a miniature stepping motor comprising a rotor constituted by a disc 1 axially magnetized in a first outer annular zone of the disc so as to have N=6 pairs of poles, the poles being alternatively positive and negative on each surface of the disc. The disc also comprises in a known manner (Swiss Pat. No. 581 920) a second magnetized annular zone located inside the first zone and having N/2 pairs of poles similar to those of the first zone but angularly shifted with respect to the poles of the said first zone.

The axis of the rotor 1 is carried by bearings, not shown, so as to support the rotor in an air gap formed between the polar parts in two pieces 2, 3 of the stator arranged and fixed by means of screws 4, 5 to a nonmagnetic support 6. By means of these screws, the pieces 2 and 3 are connected to the core 7 of an excitation coil M. The parts 2, 3 and 7 thus form a stationary magnetic circuit whose polar parts have respective polarities depending on the polarity of the excitation current passing through the coil M. The terminals $m_1$, $m_2$ of the coil M are connected to a control device 8 which will be further described below with reference to FIG. 3.

The polar parts of the pieces 2 and 3 have each cut teeth arranged opposite to one another, such as 2', 3', these teeth being angularly spaced with respect to one another, for example by an angle $\beta$, as well as a toothed central part indicated by 2" or 3", respectively. The two magnetized zones of the rotor are thus arranged in an air gap having a variable thickness, the arrangement of the assembly being such that the rotor has along its periphery $N=6$ stable equilibrium positions located in a manner which will be described with reference to FIG. 4.

Figure 3:
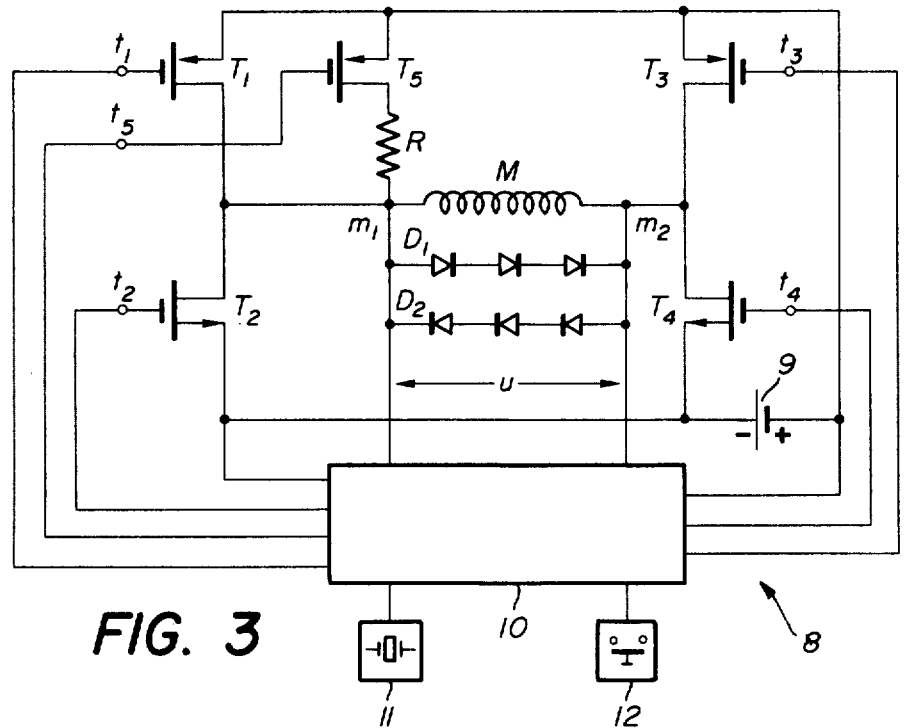
FIG. 3 is an electric circuit diagram of a motor in accordance with the present invention.

FIG. 3 is an electric circuit diagram showing the control device generally indicated by 8, which is connected across the terminals $m_1$ and $m_2$ of the coil M. In particular, this device comprises a d.c. source in the form of a battery 9 and four MOS transistors $T_1$ to $T_4$ whose conduction paths are connected, on the one hand, to a corresponding terminal of the battery 9 and, on the other hand, to either of the terminals $m_1$, $m_2$ in the manner shown in FIG. 3. The gates of the transistors $T_1$ to $T_4$ are controlled by the potential at the respective points $t_1$ to $t_4$ connected to a triggering device 10.

Control impulses corresponding to a first direction of rotation of the rotor which will be termed the normal direction are applied to the coil M by rendering transistors $T_1$ and $T_4$ conductive and transistors $T_2$ and $T_3$ non-conductive by means of appropriate potentials applied for a predetermined duration to the points $t_1$ to $t_4$ through the triggering device 10. During this time interval, the coil M is thus connected through the small resistances of the conduction paths of the MOS transistors $T_1$ and $T_4$ to the terminals of the battery 9, the terminal $m_1$ being connected to the positive terminal (+) of the battery and $m_2$ to the negative terminal (−).

Similarly, control impulses for rotation in the reverse direction of rotation with respect to the normal direction of rotation are applied to the coil M, thereby rendering transistors $T_2$ and $T_3$ conductive and transistors $T_1$ and $T_4$ non-conductive. The coil, in this case, is connected to the battery 9 with terminal $m_1$ connected to the negative terminal, and the terminal $m_2$ to the positive terminal of the battery so that a current passes through the coil M in the opposite direction with respect to the direction in the preceding case.

The voltage across the terminals $m_1$ and $m_2$ of the coil is indicated by u. As shown in FIG. 3, the circuit is protected in a conventional manner by diodes such as $D_1$ and $D_2$ respectively connected in opposite directions, and in parallel with the coil, so as to limit the voltage u in the two directions.

The control device 8 comprises an additional MOS transistor $T_5$ whose conduction path is connected in series with a resistance R between the terminal $m_1$ and the positive terminal of the battery 9. The value of the resistance R is substantially greater than the resistance of the conduction path of the MOS transistor when in its conducting state. The gate of the transistor $T_5$ is controlled by the potential at point $t_5$ which is connected to the triggering device 10.

When the transistor $T_5$ is rendered conductive simultaneously with the transistor $T_4$, the transistors $T_1$, $T_2$ and $T_3$ being maintained non-conductive, the coil M is connected in series with the resistance R between the terminals of the battery 9 in a direction which corresponds to the normal direction of rotation of the rotor.

On the other hand, FIG. 3 shows that the coil M is shortcircuited in the case in which the transistors $T_1$ and $T_3$ or $T_2$ and $T_4$ are simultaneously rendered conductive.

The triggering device 10 comprises for example a quartz oscillator whose resonator is diagrammatically shown by the reference numeral 11. This quartz oscillator generates clock impulses which are processed for example in a logic divider circuit and are used to determine the instants and the durations of application of the desired potentials to the point $t_1$ to $t_5$, i.e. potentials which render the transistors $T_1$ to $T_5$ conductive or non-conductive in accordance with the operating programme of the motor. This aspect will be explained in more detail below with reference to FIG. 4.

FIG. 3 also shows an outer control device 12 connected to the triggering device and designed to make it possible, upon being actuated, to cause the motor to rotate in the reverse direction with respect to the normal direction of rotation, in accordance with the operating programme according to which the device 10 is then switched.

Finally, FIG. 3 illustrates that the terminals of the coil M are also directly connected to the device 10. The device 10 comprises a detecting device arranged to detect the electromotive force induced in the coil, more particularly to detect for example by means of a SCHMITT trigger, when a predetermined threshold has been exceeded after the voltage u has passed through zero upon application of a control impulse. The device 10 is, in this case arranged in such a way as to render, upon detecting such an electromotive force, the transistors $T_1$ and $T_3$ or $T_2$ and $T_4$ conductive so as to shortcircuit the coil for the purposes which will be further explained below.

Figure 4:
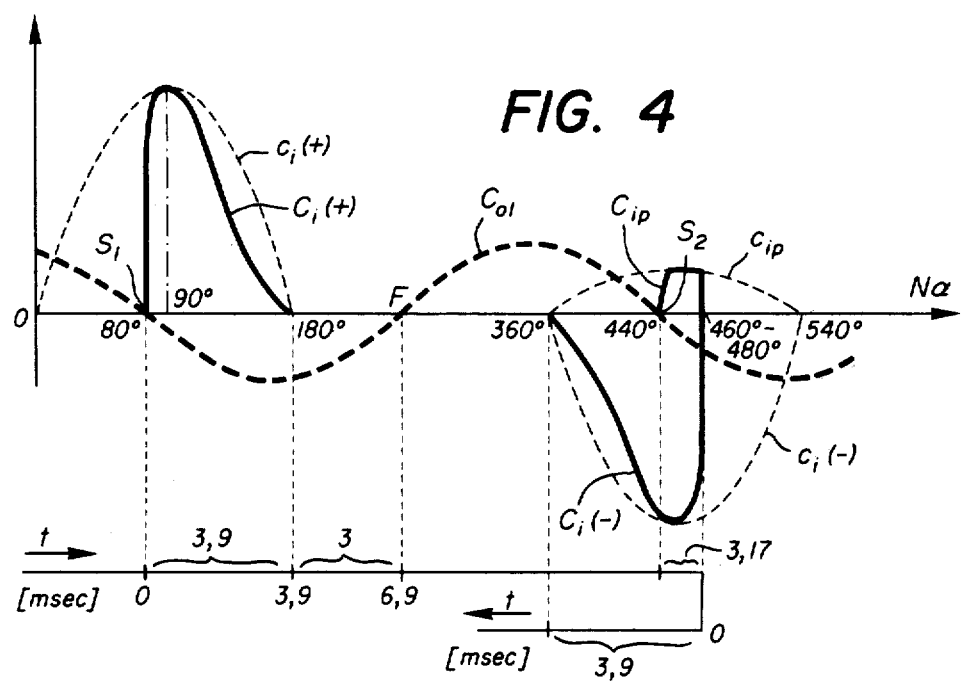
FIG. 4 is a graph showing the variation of the main components of the torque acting on the rotor as a function of its angle of rotation and time.

FIG. 4 illustrates the operation of the motor in accordance witht the present invention by showing the various components of the torque exerted on the rotor as a function of the electrical angle $N\alpha$, where $\alpha$ is the angle of rotation, and N the number of steps of the rotor for each complete rotation corresponding to the number N mentioned above in connection with FIGS. 1 and 2, and as a function of time t.

When zero current passes through the coil M, the rotor experiences a magnetic torque which is called locking torque, whose main component is indicated by $C_{01}$.

If a constant current I flows through the coil in the direction $m_1-m_2$, the corresponding torque exerted on the rotor varies proportionally to $I.\sin(N\alpha)$. A half-period of this torque is shown in dotted lines in FIG. 4 and is indicated by $c_i(+)$. For a smaller value of the constant current, a corresponding variation of the torque is for example obtained as indicated by $c_{ip}$, and for a current $-I$ the variation of the corresponding torque is indicated in this case by $c_i(-)$.

The component $C_{01}$ of the locking torque, which varies with the same periodicity as the torque due to the constant current, is shifted in phase with respect to the constant current, in a known manner, due to the arrangement of the poles on the rotor. The locking torque defines one stable equilibrium position of the rotor by period of $N\alpha$, two successive stable equilibrium positions being indicated in the drawings by $S_1$ and $S_2$. Point F corresponds to an unstable equilibrium position of the rotor.

To make it possible for a motor of this type to rotate depending upon the polarity of the excitation current in one direction of rotation or the other, the point $S_1$ is usually placed at 90° so that the energy of the impulse in the two directions of rotation is practically the same. However, owing to production tolerances and variations in the operating conditions, it is generally preferable to favour one direction of rotation by displacing forward the point $S_1$ with respect to 90° so as to increase the work spent by the control impulse for one direction of rotation. In the motors used at present this resulted in loosing the possibility of rotating the motor in the reverse direction, since the work involved with the corresponding impulses, account being taken in particular of the operating conditions generally imposed, in particular in the case in which the motor is used in a quartz watch, is no longer sufficient to ensure a correct operation in the reverse direction.

In FIG. 4, the torque due to one current impulse applied to the coil when the motor is at start in the stable equilibrium position $S_1$ placed at $N\alpha = 80°$ is indicated by $C_i(+)$. The control impulse has for example a duration of 3.9 msec. corresponding to the rotation of the rotor of $N\alpha \approx 180°$.

Figure 5:
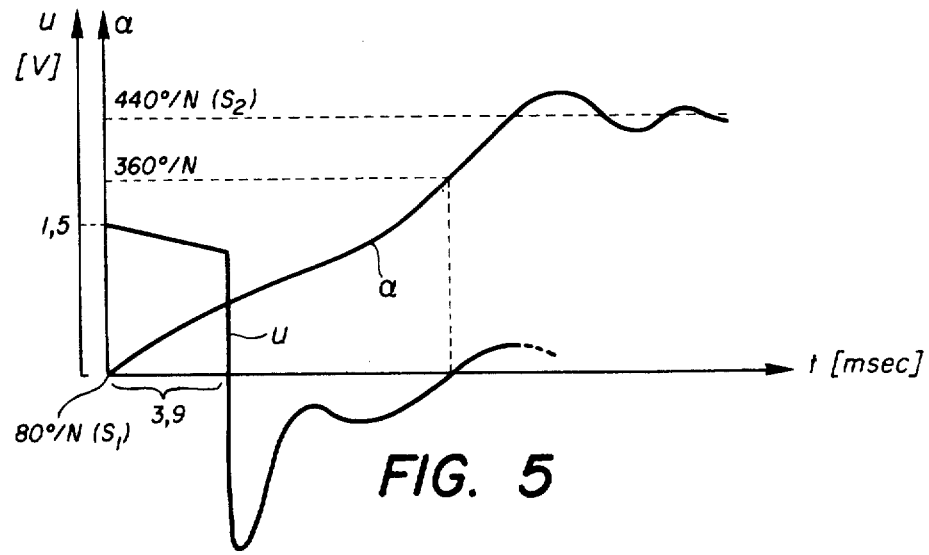
FIG. 5 is a graph showing the variations with time of the voltage across the terminals of the coil (shown in FIG. 3) and the angular position of the rotor for a control impulse in the normal direction of rotation without braking.

FIG. 5 shows by way of illustration, the voltage u of the control impulse and the angle $\alpha$ of rotation as a function of time. The kinetic energy imparted to the rotor by the control impulse makes it possible for the rotor to pass the point F before which $C_{01}$ is negative and after which the locking torque acts in the direction of rotation until the next stable equilibrium position $S_2$ is reached. It is then preferable not to damp the movement by shortcircuiting the coil between the trailing edge of the control impulse and the point F. Thus, the transistors $T_1$ to $T_5$ are non-conductive during this time interval.

To improve the operation of the motor, particularly in the conditions of this example, it has been found to be advantageous to brake the rotor by short-circuiting the coil by means of the triggering device e.g. at the end of a predetermined time interval after the end of the impulse $C_i(+)$. This interval is determined, in this case, by the divider circuit of the triggering device and corresponds to an angle of rotation slightly greater than that at which the point F is located. Another solution for controlling braking will be explained with reference to FIG. 6.

Thus, the rotor stops in a position corresponding to the point $S_2$ with a strong damping action of its oscillation around that position. The motor has effected a step in the normal direction of rotation.

If the outer control device which controls rotation in the reverse direction is actuated, for example in such a way that the reverse rotation must start from the stable equilibrium position $S_2$, the operating programme of the triggering device 10, i.e. the instants of occurrence and the durations of the potentials applied to the points $t_1$ to $t_5$ is as follows.

Starting from the stable equilibrium position, an impulse $C_{ip}$ which is termed a pre-impulse, is applied to the rotor by rendering transistors $T_5$ and $T_4$ simultaneously conductive, while the transistors $T_1$ to $T_3$ are non-conductive. The amplitude of the corresponding excitation current is limited by the resistance R connected in series with the coil M. This amplitude and the duration of the impulse defined by the triggering device are chosen so that the rotor is accelerated and advances in the normal direction of rotation, but the energy of this pre-impulse is insufficient for the motor to effect a step in the normal direction. Conversely, this energy is sufficient to ensure a rotation of the rotor at least until a region of angular positions is reached which is located at or substantially at a position symmetrical to the stable equilibrium position with respect to the position in which the effect of a constant current would have its maximum. In the example illustrated in FIG. 4, this region is located between 460° and 480°.

At the end of the pre-impulse duration, the rotor is then in the above-mentioned zone, and a control impulse for rotation in the opposite direction is generated by the device 10, i.e. the transistors $T_2$ and $T_3$ are simultaneously rendered conductive and the transistors $T_1$, $T_4$ and $T_5$ non-conductive. The corresponding torque is indicated by $C_i(-)$ in FIG. 4, the time scale being reversed at the start of the impulse. Of course this scale indicated in FIG. 4 is non-linear compared with the linear scale of the angular positions of the rotor. An example of the durations of the above-mentioned various phases is indicated in FIG. 4.

Figure 6:
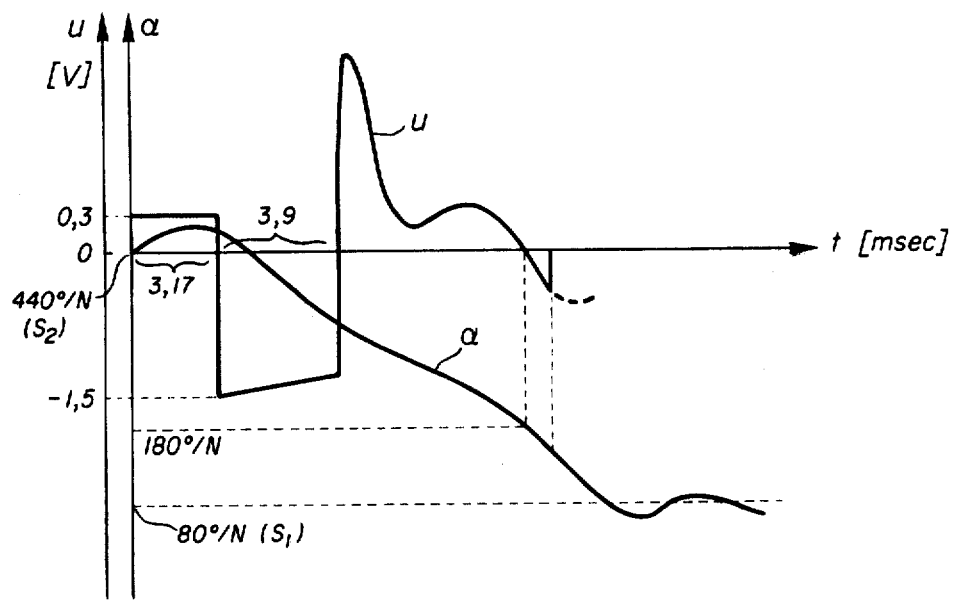
FIG. 6 is a graph similar to that of FIG. 5 illustrating the drive in the reverse direction followed by braking in accordance with a characteristic of the present invention.

FIG. 6 shows the variation of the voltage u across the terminals of the coil M and the angle of rotation $\alpha$ as a function of time starting from the instant which corresponds, in the example shown, to the instant at which the pre-impulse is applied in the stable equilibrium position $S_2$. In the example shown in FIG. 6, the amplitude and the width of the pre-impulse are such that the rotor advances in the normal direction of rotation until the position is reached in which its movement is reversed under the influence of the torque $C_{01}$ to return towards to stable equilibrium position $S_2$. At the end of the pre-impulse duration, i.e. after 3.17 msec. in the example shown, a control impulse in the reverse direction for example having an amplitude equal to that of the control impulse in the normal direction and a width of 3.9 msec. acts on the rotor and imparts to it kinetic energy sufficient to effect a step in the reverse direction, i.e. sufficient to reach the stable equilibrium position $S_1$.

As shown in FIG. 5 and 6, the rotor oscillates about the stable equilibrium position before stopping. As already mentioned above, it is advantageous to brake the rotor by short-circuiting the coil M starting from a predetermined instant after the end of the control impulse. A first solution as already mentioned above would be to provide a fixed time interval defined depending upon the control impulse.

FIG. 6 illustrates an alternative method based on detection of a variation in the voltage u across the terminals of the coil M after the control impulse in the normal direction or in the reverse direction as shown in FIG. 6. To this end, the coil M is connected to a detecting device which is a part of the triggering device 10 and is arranged in such a way that it detects when a predetermined threshold has been exceeded after passing through zero by the electromotive force induced in the coil. At this time, the detecting device generates a signal which results in potentials being applied to the points $t_1$ to $t_5$ in the triggering device so that the coil M is shortcircuited. The rotation of the rotor is thus strongly damped and the rotor is stopped in an optimum fashion at the stable equilibrium position.

Thus, the present invention makes it possible to adapt a motor of the type mentioned above to a correct operation in the two directions of rotation, account being taken of the production tolerances and variations of the operating conditions of the motor, while ensuring a very high efficiency in the conversion of electric energy into mechanical energy and most reliable operation as generally required in applications of such a motor.

As will be apparent to persons skilled in the art, various modifications, adaptations and variations of the foregoing specific disclosure can be made without departing from the teachings of this invention.

We claim:

1. A miniature electric stepping motor comprising a magnetized rotor, a stationary magnetic circuit having spaced polar parts defining an air gap, an electric excitation coil coupled to the stationary magnetic circuit, and a control device connected to the said excitation coil, means for mounting the magnetized rotor for rotation in said air gap so that its poles cooperate with the polar parts of the stationary magnetic circuit, the magnetization of the rotor and the form of the polar parts being such that the rotor has at least one stable, equilibrium position located so as to precede, with respect to a first direction of rotation, the position in which the torque due to a constant current through the coil would attain its maximum, the control device comprising means for applying to the excitation coil, starting from each stable equilibrium position of the rotor, a control impulse having a first polarity, and having an amplitude and a width such that the rotor rotates in the said first direction of rotation until it reaches the next stable equilibrium position, and means for applying to the excitation coil, upon an external control, starting from each stable equilibrium position, first a pre-impulse of said first polarity and having an amplitude and a width such that the rotor rotates in the first direction of rotation but cannot reach the next stable equilibrium position in this direction of rotation, and subsequently a control impulse in the reverse direction, having a polarity opposite to the said first polarity and an amplitude and width such that the rotor, after having reversed its direction of rotation, moves in the reverse direction of rotation until it reaches the stable equilibrium position following that at which the said pre-impulse has been applied.

2. A motor as claimed in claim 1, wherein the control device comprises means for producing said control impulse in the reverse direction at an instant at which the rotor has advanced under the effect of the pre-impulse to a position substantially symmetrical to the stable equilibrium position with respect to the position in which the torque due to a constant current attains its maximum.

3. A motor as claimed in claim 1, wherein the control device comprises a d.c. source, a clock signal source, electronic switching devices connected to the excitation coil and the d.c. source and controllable by signals from the clock signal source for connecting the excitation coil at predetermined intervals and for predetermined durations to the d.c. source, a further electronic switching device, and external control means for causing rotation in the reverse direction, and being arranged so as to control, by means of clock signals, the further electronic switching device operable in such a way as to apply the pre-impulse, having a predetermined amplitude and width, to the excitation coil.

4. A motor as claimed in claim 1, wherein the control device has means for shortcircuiting the excitation coil after a predetermined time interval following each control impulse.

5. A motor as claimed in claim 1, wherein the control device comprises means for shortcircuiting the excitation coil after each control impulse in response to a detecting circuit connected to the excitation coil for detecting the electromotive force induced by the magnetized rotor in the coil.

6. A motor as claimed in claim 5, wherein the detecting circuit is arranged to detect when a pre-determined threshold, after a first passage through zero, of the said electromotive force is exceeded.

* * * * *